United States Patent
Bliven

(10) Patent No.: US 8,921,769 B2
(45) Date of Patent: Dec. 30, 2014

(54) MULTIPOSITION TARGET PLANE FOR VARIABLE SOURCE-DETECTOR DISTANCE USING DD, DT SEALED NEUTRON SOURCE

(75) Inventor: Steven M. Bliven, Magnolia, TX (US)

(73) Assignee: Baker Hughes Incorporated, Houston, TX (US)

(*) Notice: Subject to any disclaimer, the term of this patent is extended or adjusted under 35 U.S.C. 154(b) by 211 days.

(21) Appl. No.: 13/585,542

(22) Filed: Aug. 14, 2012

(65) Prior Publication Data

US 2013/0048848 A1    Feb. 28, 2013

Related U.S. Application Data

(60) Provisional application No. 61/528,014, filed on Aug. 26, 2011.

(51) Int. Cl.
*G01V 5/10* (2006.01)
*H05H 3/06* (2006.01)

(52) U.S. Cl.
CPC . *G01V 5/101* (2013.01); *H05H 3/06* (2013.01)
USPC .................................. 250/269.4; 250/269.6

(58) Field of Classification Search
CPC ............. H05H 3/06; H05H 6/00; G01V 5/00; G01V 5/101
USPC ........................... 250/269.4, 269.6
See application file for complete search history.

(56) References Cited

U.S. PATENT DOCUMENTS

| | | | | |
|---|---|---|---|---|
| 2,769,096 | A | * | 10/1956 | Frey, Jr. ........................ 376/118 |
| 3,968,377 | A | * | 7/1976 | Farrell ........................ 376/116 |
| 6,925,137 | B1 | | 8/2005 | Forman |
| 7,538,319 | B2 | | 5/2009 | Jacobi et al. |
| 2005/0012044 | A1 | | 1/2005 | Tadokoro et al. |
| 2006/0033023 | A1 | | 2/2006 | Pemper et al. |
| 2006/0243898 | A1 | | 11/2006 | Gilchrist et al. |
| 2008/0049888 | A1 | * | 2/2008 | Leung et al. ...................... 378/4 |
| 2008/0251710 | A1 | | 10/2008 | Riley et al. |
| 2011/0114830 | A1 | | 5/2011 | Reijonen et al. |

FOREIGN PATENT DOCUMENTS

| | | | | |
|---|---|---|---|---|
| JP | 08219909 | A | * | 8/1996 |
| JP | 2000162390 | A | * | 6/2000 |
| WO | 9819817 | A1 | | 5/1998 |

OTHER PUBLICATIONS

Machine (Google) Translation of JP 8-219909 A.*

* cited by examiner

*Primary Examiner* — Constantine Hannaher
(74) *Attorney, Agent, or Firm* — Mossman Kumar & Tyler PC

(57) ABSTRACT

Method and apparatus for evaluating an earth formation using at least one detector with a pulsed neutron source that includes a beam of deuterium ions that can be directed to a selected position on a target including tritium that extends axially along a sealed tube. This makes it possible to generate pulsed neutrons from a plurality of positions.

20 Claims, 3 Drawing Sheets

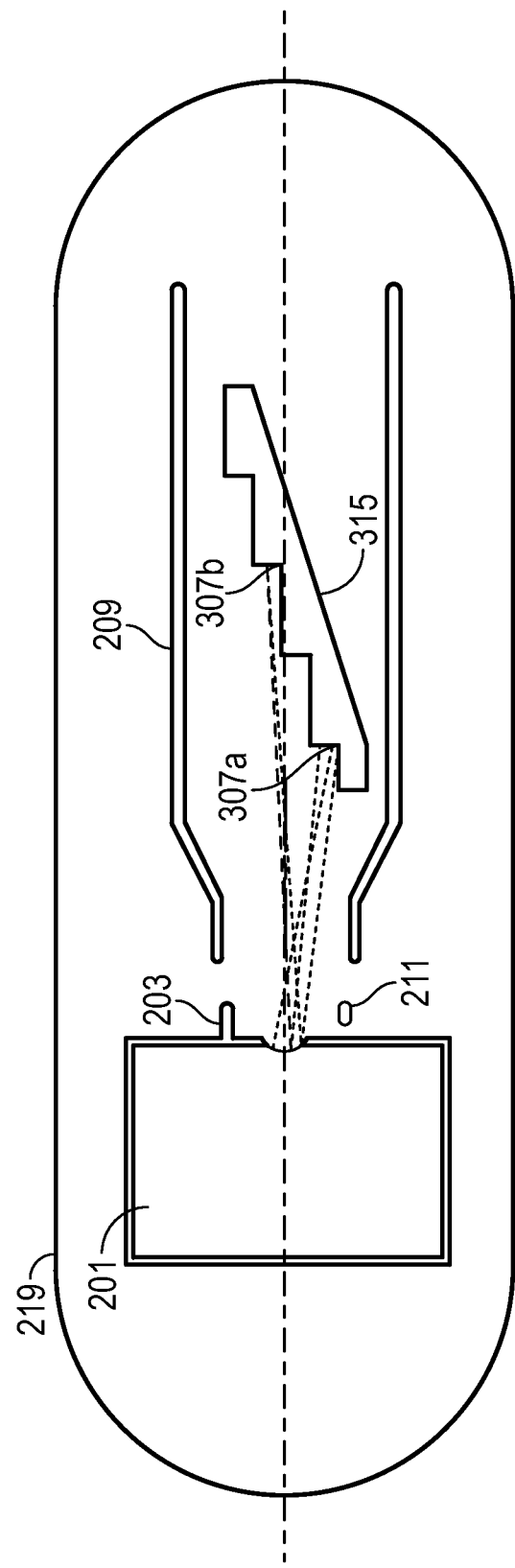

MULTIPOSITION TARGET PLANE FOR VARIABLE SOURCE-DETECTOR DISTANCE USING DD, DT SEALED NEUTRON SOURCE

CROSS-REFERENCE TO RELATED APPLICATION

This application claims priority from U.S. Provisional Patent Application Ser. No. 61/528,014, filed on 26 Aug. 2011, incorporated herein by reference in its entirety.

BACKGROUND OF THE DISCLOSURE

This disclosure relates generally to oil and gas borehole logging tools. More particularly, this disclosure relates tools for measuring rock formation properties such as density and porosity. This disclosure relates to an improved density and/or porosity tool having a sealed radiation source having a controllable position. Measurements using pulsed neutron generators are useful in determining porosity, hydrocarbon saturation, and hydrocarbon type.

In petroleum and hydrocarbon production, it is desirable to know the porosity and density of the subterranean formations which contain hydrocarbon reserves. Knowledge of porosity is essential in calculating the oil saturation and thus the volume of oil in-place within the reservoir. Knowledge of porosity is particularly useful in older oil boreholes where porosity information is either insufficient or nonexistent to determine the remaining in-place oil and to determine whether sufficient oil exists to justify applying enhanced recovery methods. Porosity information is also helpful in identifying up-hole gas zones and differentiating between low porosity liquid and gas.

If the density of the formation is known, then porosity can be determined using known equations. A variety of tools exist which allow the density of the reservoir to be determined. Most of these tools are effective in determining the density (and hence porosity) of the reservoir when the borehole in which the tool is run is an uncased reservoir and the tool is able to contact the subterranean medium itself. However, once a borehole has been cased, there exists a layer of steel and concrete between the interior of the borehole where the tool is located and the formation itself. The borehole casing makes it difficult for signals to pass between the tool and the reservoir and vice-versa.

Many of the commonly used porosity and density measuring tools rely on the detection of gamma rays or neutrons resulting from activation of either a neutron source downhole or a gamma ray source. Existing logging tools and LWD design considerations rely on established source to detector distances or ratios of distances in the case of multiple detectors to provide various analyses related to the formation and borehole environment. A pulsed beam partially or wholly of deuterium is directed onto a suitable target having tritium and pulsed neutrons are emitted from the target.

Having a plurality of target locations allows the operator to gather information not readily available through a fixed position system. The additional information would be related to such parameters as borehole corrections, depth of maximum sensitivity for detector responses, and alternate or additional statistical treatments for zones of particular interest. The present disclosure satisfies this need.

SUMMARY OF THE DISCLOSURE

One embodiment of the disclosure is an apparatus configured to estimate a value of a property of an earth formation. The apparatus includes: a tool including a sealed container configured to be conveyed in a borehole; a radiation source on the tool configured to irradiate the earth formation from a plurality of axially spaced apart locations inside the sealed container; at least one detector configured to produce a signal responsive to interaction of the radiation with the earth formation; and a processor configured to estimate the value of the property using the signal.

Another embodiment of the disclosure includes a method of estimating a value of a property of an earth formation. The method includes: estimating the value of the property using a signal generated by at least one detector conveyed in a borehole penetrating the earth formation and configured to produce the signal, the at least one detector being responsive to the interaction of radiation with the earth formation, where the radiation is generated by a radiation source configured to irradiate from a plurality of axially spaced apart locations inside a sealed container.

Another embodiment of the disclosure is a non-transitory computer-readable medium product having stored thereon instructions that when read by a processor cause the processor to execute a method. The method includes: estimating a value of a property using a signal generated by at least one detector conveyed in a borehole penetrating an earth formation and configured to produce the signal, the at least one detector being responsive to the interaction of radiation with the earth formation, where the radiation is generated by a radiation source configured to irradiate from a plurality of axially spaced apart locations inside a sealed container.

BRIEF DESCRIPTION OF THE FIGURES

The present disclosure is best understood with reference to the accompanying figures in which like numerals refer to like elements and in which:

FIG. 3 illustrates a pulsed neutron source having a stepped target for one embodiment according to the present disclosure.

DETAILED DESCRIPTION OF THE DISCLOSURE

Figure 1:
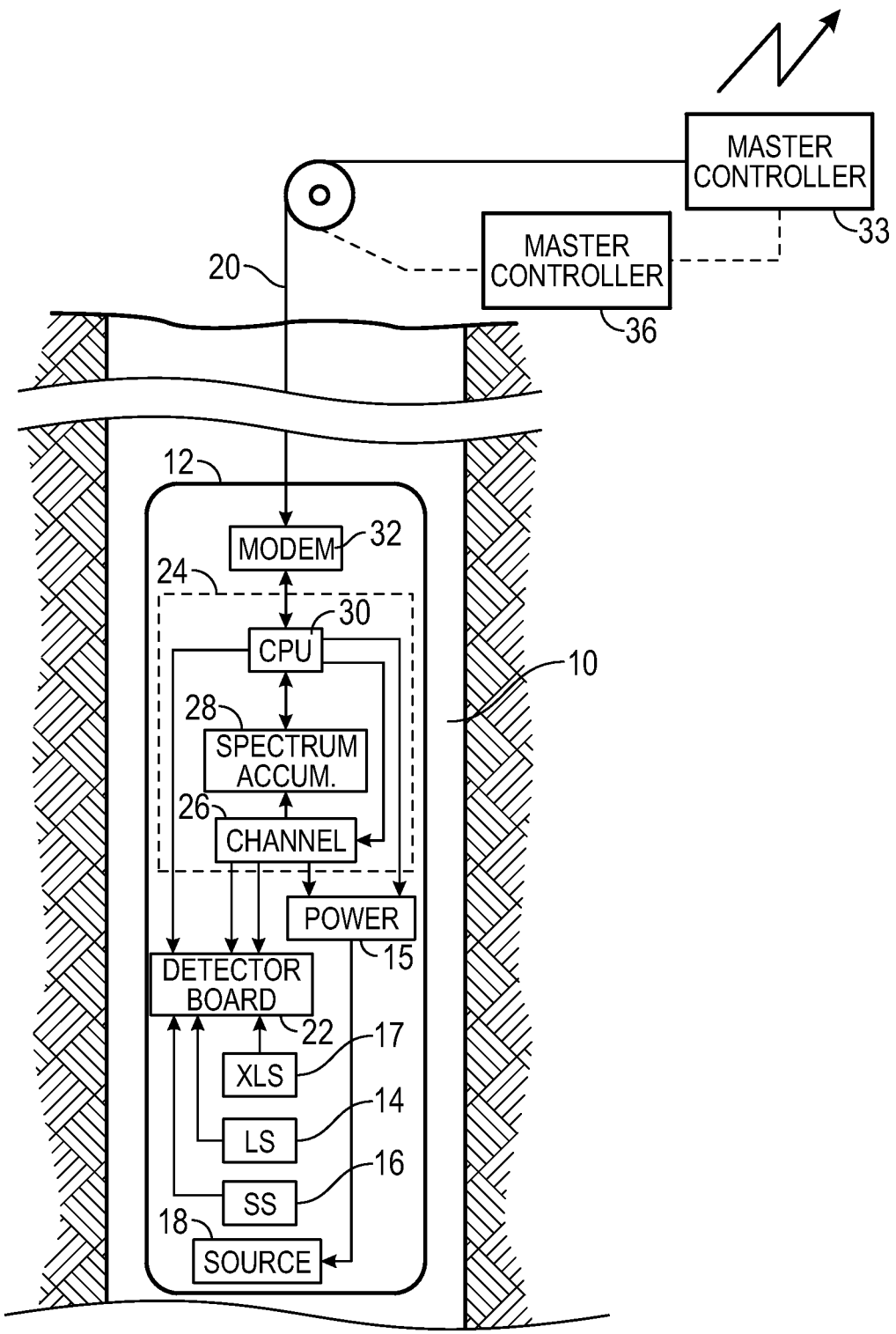
FIG. 1 is an overall schematic diagram of an exemplary nuclear borehole logging system for one embodiment according to the present disclosure.

The system shown in FIG. 1 is an exemplary system for density logging. This is not to be construed as a limitation as the normal source of the present disclosure can also be used for porosity logging or any other application where a pulsed neutron source is needed. Borehole 10 penetrates the earth's surface and may or may not be cased depending upon the particular borehole being investigated. While a wireline system is shown, this is not to be construed as a limitation of the disclosure as the method of the disclosure is applicable to MWD systems and an MWD implementation of the apparatus may be done. Disposed within borehole 10 is subsurface borehole logging instrument 12. The system diagramed in FIG. 1 may include a microprocessor-based nuclear borehole logging system using multi-channel scale analysis for determining the timing distributions of the detected gamma rays. It should be noted that while the description is in terms of gamma ray detectors, the disclosure is equally applicable to other nuclear detectors, such as neutron detectors. Borehole logging instrument 12 includes an extra-long spaced (XLS)

detector 17, a long-spaced (LS) detector 14, a short-spaced (SS) detector 16 and pulsed neutron source 18. In one embodiment of the disclosure, XLS, LS and SS detectors 17, 14, 16 are comprised of bismuth-germanate (BGO) crystals coupled to photomultiplier tubes. Typically, to protect the detector systems from the high temperatures encountered in boreholes, some detector systems may be mounted in a Dewar-type flask. The present disclosure envisages eliminating the Dewar flask for reasons discussed below. Also, in one embodiment of the disclosure, source 18 comprises a pulsed neutron source using a D-T reaction wherein deuterium ions are accelerated onto a tritium target, thereby generating neutrons having an energy of approximately 14 MeV. The filament current and accelerator voltage are supplied to source 18 through power supply 15. Cable 20 suspends instrument 12 in borehole 10 and contains the required conductors for electrically connecting instrument 12 with the surface apparatus.

The outputs from XLS, LS, and SS detectors 17, 14, 16 may be coupled to detector board 22, which may amplify these outputs and compare them to an adjustable discriminator level for passage to channel generator 26. Channel generator 26 is a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 33 coupled to cable 20 for recovery of data from instrument 12 and for transmitting command signals to instrument 12. There is also associated with the surface apparatus depth controller 36 which provides signals to master controller 33 indicating the movement of instrument 12 within borehole 10. Master controller 33 may be configured to allow the system operator access to the master controller 33 to provide selected input for the logging operation to be performed by the system. A display unit (not shown) and mass storage unit (not shown) may also be coupled to master controller 33. The primary purpose of the display unit is to provide visual indications of the generated logging data as well as systems operations data. The storage unit is provided for storing logging data generated by the system as well as for retrieval of stored data and system operation programs. A satellite link may be provided to send data and or receive instructions from a remote location.

In a borehole logging operation such as is illustrated by FIG. 1, master controller 33 initially transmits system operation programs and command signals to be implemented by CPU 30, such programs and signals being related to the particular borehole logging operation. Instrument 12 may then be conveyed to traverse borehole 10 in a conventional manner, with source 18 being pulsed in response to synchronization signals from channel generator 26. Typically, source 18 is pulsed at a rate of 1000 bursts/second (1 kHz) and 10,000 bursts/second (10 kHz). This, in turn, causes a burst of high energy neutrons on the order of 14 MeV to be introduced into the surrounding formation to be investigated. The population of high energy neutrons introduced into the formation will cause the generation of gamma rays within the formation which at various times will impinge on XLS, LS, and SS detectors 17, 14, 16. As each gamma ray thus impinges upon the crystal-photomultiplier tube arrangement of the detectors 17, 14, 16, a voltage pulse having an amplitude related to the energy of the particular gamma ray is delivered to detector board 22. It will be recalled that detector board 22 may amplify each pulse and compare each pulse to an adjustable discriminator level, typically set at a value corresponding to approximately 100 KeV. If such a pulse has an amplitude corresponding to an energy of at least approximately 100 KeV, the voltage pulse is transformed into a digital signal and passed to channel generator 26 of MCS section 24.

In addition, as would be known to those versed in the art and having benefit of the present disclosure, many of the functions of the components described with reference to FIG. 1 may be carried out by a processor. It should also be noted that the system described in FIG. 1 involves conveyance of the logging device into the borehole by a wireline. However, it is envisaged that the logging device could be part of a measurement while drilling (MWD) bottom hole assembly conveyed into the borehole by a drilling tubular such as a drillstring or coiled tubing. In addition, it should be noted that FIG. 1 illustrates a tool in an open hole. The method and apparatus are equally well suited for use in cased holes.

Figure 2:
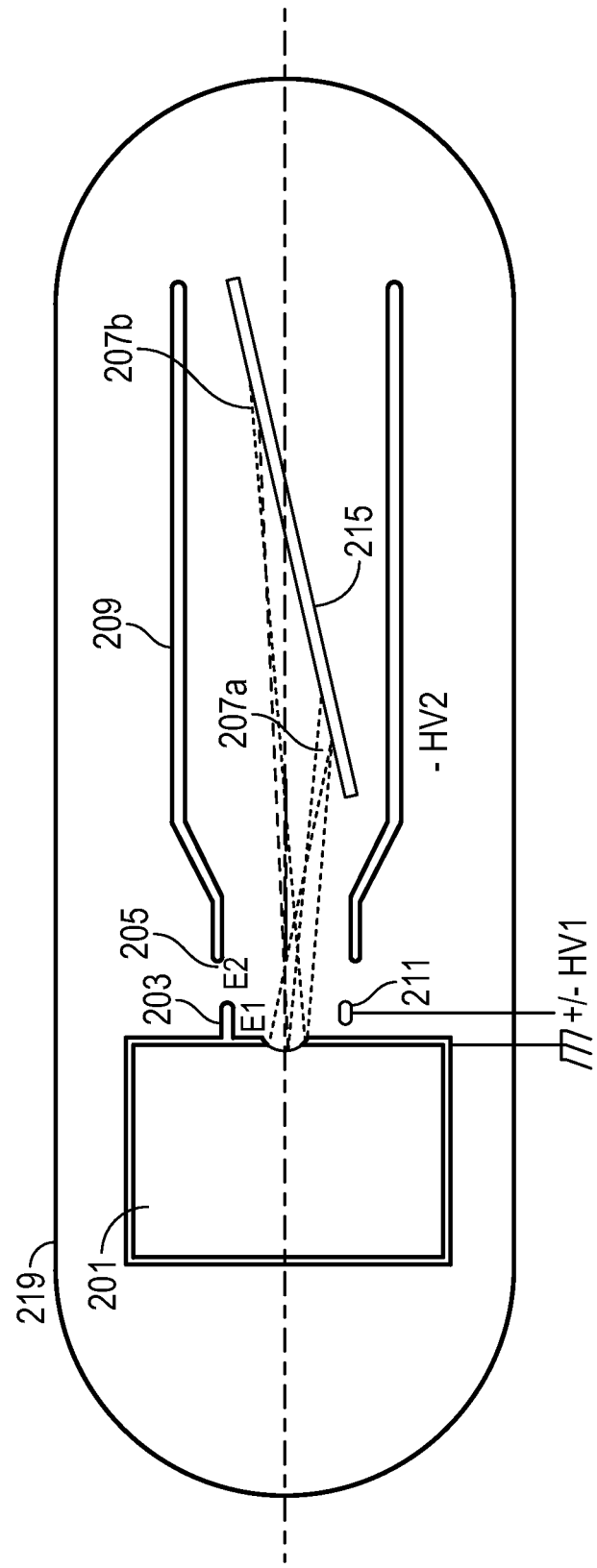
FIG. 2 illustrates a pulsed neutron source in which the target location is in the continuously variable for one embodiment according to the present disclosure.

FIG. 2 shows an illustration of a pulsed neutron source according to one embodiment of the present disclosure. Shown therein is an ion source 201 that produces ions, including those of deuterium. A target 215 containing tritium is positioned inside an accelerator electrode 209 which is also inside a sealed tube 219, along with ion source 201. The ion source 201 may produce ions in response to a voltage on an accelerator electrode 209. Accelerator electrode 209 may generate an electrical gradient field 205 to direct the deuterium ions along the tube 219. The direction of the beam of ions from ion source 201 may be directed by a beam director comprising an electrode 203 and an additional electrode 211. By varying a voltage difference between electrode 203 and electrode 211, the beam may be shifted in a direction substantially orthogonal to the axis of tube 219. The voltage of the additional electrode may be switchable so that ions emerging from the ion source 201 can be deflected with respect to the axis of the tube 219. Consequently, the deuterium ions strike the target 215 at different locations along the axis of the tube 219. Varying the voltages of electrode 203 and electrode 211 may cause the beam of ions to sweep between positions on target 215. In an alternative embodiment, the beam of ions may be directed by varying a magnetic field produced by a magnetic source (not shown) instead of or in addition to electrodes 203, 211. In some embodiments, the axis of the sealed tube 219 and the axis formed by the center of accelerator electrode 209 may not be coterminous, and the deflection of the beam of ions may be relative to the axis formed by the accelerator electrode 209 instead of the sealed tube 219.

As shown in FIG. 2, the target zone where neutrons are produced by interaction between the deuterium ions and the tritium target can be continuously variable along the axis of the tube 219. Two such positions are shown by 207a and 207b. By changing the axial position of the source of the pulsed neutrons, the distance between the source and the detector(s) of the logging instrument can be altered. In known processing steps where ratios of distances between the source and a plurality of detectors are used, the additional measurements can be used to improve the statistical precision of the estimated properties. In addition, as can be seen, the distance between the target zone and the fluid in the borehole can also be changed. The ability to generate neutrons in close proximity to the borehole fluid may be useful when trying to estimate the properties of the borehole fluid. Additional information related to borehole correction, and depth of maximum sensitivity to detector response may also be obtained. It should be noted that the use of deuterium and tritium is not to be construed as a limitation. Neutrons may be generated by the interaction between one species of hydrogen isotopic ions and another species of hydrogen isotopic material.

FIG. 3 shows an illustration of a pulsed neutron source according to another embodiment of the present disclosure. Shown therein is an ion source 201 that produces ions including those of deuterium. The target 315, which includes tritium in this embodiment, comprises a stepped target so that neutrons are produced at a discreet set of locations. The target 315 may be positioned inside accelerator electrode 209, which is inside the sealed tube 219, along with ion source 201. As in the embodiment of FIG. 2, the ion source is provided with an electrode 203 and an additional electrode 211 configured to direct the beam of ions. The voltage of the additional electrode 211 may be switchable so that ions emerging from the ion source 201 can be deflected with respect to the axis of the tube 219. Consequently, the deuterium ions strike the target 215 at different discreet locations such as 307a and 307b along the axis of the tube 219. The pulsed neutron source is also provided with an electrical gradient field 205 to direct the deuterium ions along the tube 219. By changing the axial position of the source of the pulsed neutrons, the distance between the source and the detector(s) of the logging instrument can be altered.

In known processing steps, where ratios of distances between the source and a plurality of detectors are used, the additional measurements can be used to improve the statistical precision of the estimated properties. In addition, as can be seen, the distance between the target zone and the fluid in the borehole can also be changed. The ability to generate neutrons in close proximity to the borehole fluid may be useful when trying to estimate the properties of the borehole fluid. Additional information related to borehole correction, and depth of maximum sensitivity to detector response may also be obtained.

Those versed in the art and having benefit of the present disclosure would recognize that in prior art devices, there is damage to the target by the phenomenon of sputtering. Hence by having a target location that could be anywhere within the tube 209, an operational advantage results: in comparison with a fixed target, the pulsed neutron source according to either of the embodiments above would need less maintenance and lifetime limitations associated with target material burn-through would be reduced because of the plurality of target positions.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable non-transitory computer-readable medium that enables the processors to perform the control and processing. The non-transitory computer-readable medium may include ROMs, EPROMs, EEPROMs, Flash Memories and Optical disks.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. An apparatus configured to estimate a value of a property of an earth formation, the apparatus comprising:
a tool including a sealed container configured to be conveyed in a borehole;
a radiation source on the tool configured to irradiate the earth formation from a plurality of axially spaced apart locations inside the sealed container by changing the axial position of the source of the irradiation;
at least one detector configured to produce a signal responsive to interaction of the radiation with the earth formation; and
at least one processor configured to estimate the value of the property using the signal;
wherein the radiation source further comprises:
a source of a beam of ions;
a target extending axially along the sealed container; and
a beam director configured to direct the beam of ions to at least two of the plurality of axially spaced apart locations by shifting the direction of the beam.

2. The apparatus of claim 1, wherein the beam director comprises at least one of: (i) a pair of electrodes and (ii) a magnetic field source.

3. The apparatus of claim 1 wherein the target further comprises a stepped target and wherein the plurality of axially spaced apart locations further comprise a discrete set of locations.

4. The apparatus of claim 1 wherein the target further comprises an inclined planar target.

5. The apparatus of claim 1 wherein the radiation further comprises neutrons and the at least one detector is responsive to at least one of: (i) gamma rays, or (ii) neutrons.

6. The apparatus of claim 1 wherein the value of the property is at least one of: (i) formation sigma, (ii) a density, (iii) a porosity, or (iv) a presence of at least one elemental constituent.

7. The apparatus of claim 1 wherein the tool is configured to be conveyed into the borehole on a conveyance device selected from: (i) a wireline and (ii) a bottom hole assembly configured to be conveyed into the borehole on a drilling tubular.

8. The apparatus of claim 1 wherein the at least one species of hydrogen isotopic ions is selected from: (i) deuterium and (ii) tritium.

9. The apparatus of claim 1 wherein:
the source of the beam of ions is composed of at least one species of hydrogen isotopic ions;
the target extending axially along the sealed container includes at least one species of hydrogen isotopic material; and
the beam director provides the irradiation by interaction of the ions with the at least one species of hydrogen isotopic material in the target.

10. A method of estimating a value of a property of an earth formation, the method comprising:
estimating the value of the property using a signal generated by at least one detector conveyed in a borehole penetrating the earth formation and configured to produce the signal, the at least one detector being responsive to the interaction of radiation with the earth formation, where the radiation is generated by a radiation source configured to irradiate from a plurality of axially spaced apart locations inside a sealed container by changing the axial position of the source of the irradiation;

wherein the radiation source further comprises:
a source of a beam of ions;
a target extending axially along the sealed container; and
a beam director configured to direct the beam of ions to at least two of the plurality of axially spaced apart locations by shifting the direction of the beam.

11. The method of claim 10 further comprising using the radiation source, wherein using the radiation source includes:
activating the source of a beam of ions, wherein the ions are at least one species of isotopic hydrogen ions; and
using the beam director for directing the beam of hydrogen isotopic ions to the target at the at least two of the plurality of axially spaced apart locations and providing the irradiation by interaction of the beam with a target material including at least one isotopic species of hydrogen.

12. The method of claim 11, wherein the beam director comprises at least one of: (i) a pair of electrodes and (ii) a magnetic field source.

13. The method of claim 11 further comprising using, for the beam of ions, at least one species of hydrogen isotopic ions selected from: deuterium and tritium.

14. The method of claim 10 further comprising using, for the target, a stepped target and wherein the plurality of axially spaced apart locations further comprise a discrete set of locations.

15. The method of claim 10 further comprising using, for the target, an inclined planar target.

16. The method of claim 10 wherein the radiation comprises neutrons, the method further comprising:
using for the at least one detector, a detector responsive to at least one of: (i) gamma rays, or (ii) neutrons.

17. The method of claim 10 wherein the property whose value is estimated is at least one of: (i) formation sigma, (ii) a density, (iii) porosity, or (iv) a presence of at least one elemental constituent.

18. The method of claim 10 further comprising conveying the tool into the borehole on a conveyance device selected from: (i) a wireline and (ii) a bottom hole assembly conveyed into the borehole on a drilling tubular.

19. A non-transitory computer-readable medium product having stored thereon instructions that when read by a processor cause the processor to execute a method, the method comprising:
estimating a value of a property using a signal generated by at least one detector conveyed in a borehole penetrating an earth formation and configured to produce the signal, the at least one detector being responsive to the interaction of radiation with the earth formation, where the radiation is generated by a radiation source configured to irradiate from a plurality of axially spaced apart locations inside a sealed container by changing the axial position of the source of the irradiation;
wherein the radiation source further comprises:
a source of a beam of ions;
a target extending axially along the sealed container; and
a beam director configured to direct the beam of ions to at least two of the plurality of axially spaced apart locations by shifting the direction of the beam.

20. The non-transitory computer-readable medium product of claim 19 further comprising at least one of: (i) a ROM, (ii) an EPROM, (iii) an EEPROM, (iv) a flash memory, or (v) an optical disk.

* * * * *